Oct. 24, 1961     J. B. FENN     3,005,762
ELECTRIC DISCHARGE JET STREAM
Filed Jan. 20, 1958
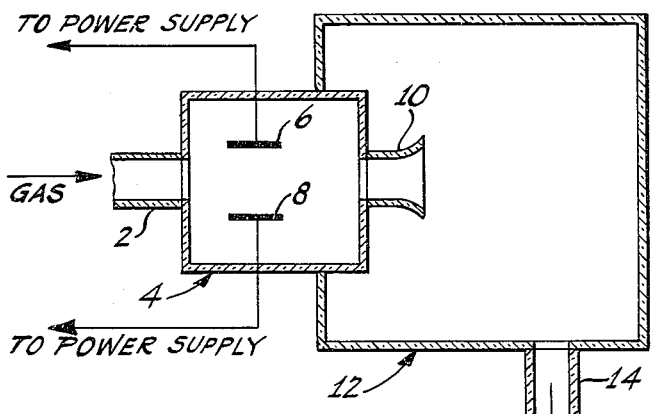
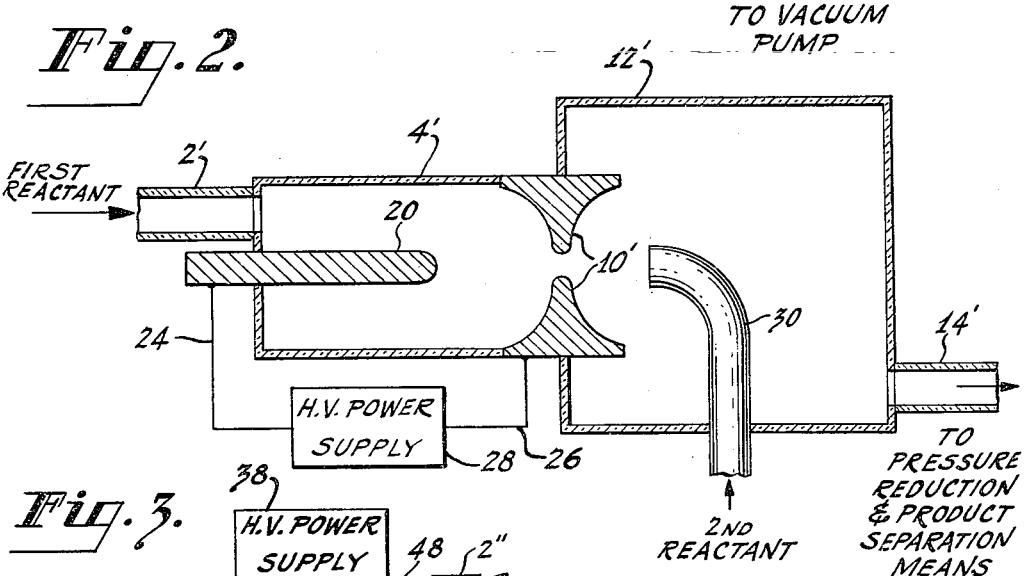
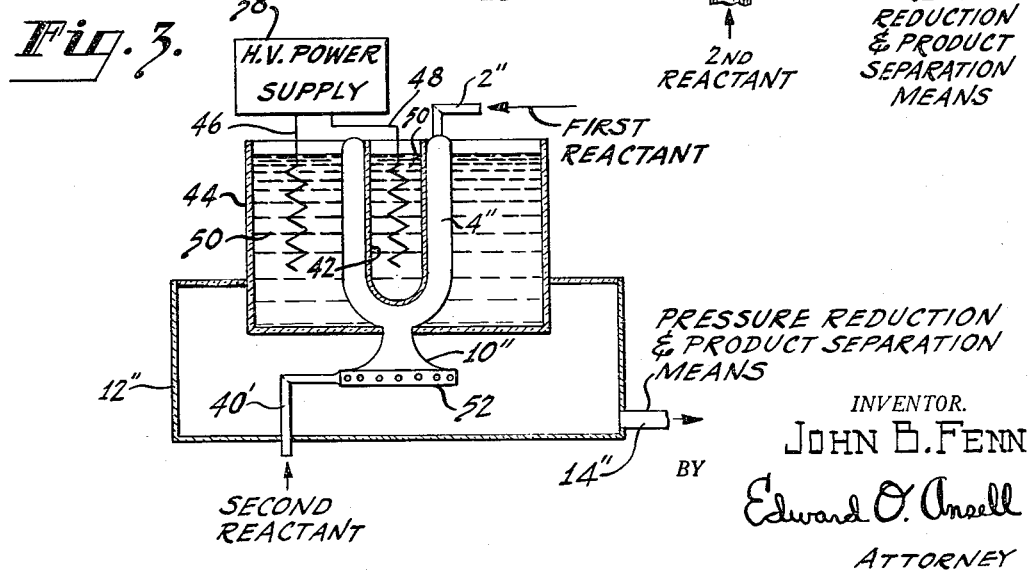
INVENTOR.
JOHN B. FENN
BY
Edward O. Ansell
ATTORNEY

3,005,762
ELECTRIC DISCHARGE JET STREAM
John B. Fenn, near Princeton, N.J., assignor to Aero Chem Research Laboratories, Inc., a corporation of Maryland
Filed Jan. 20, 1958, Ser. No. 709,918
9 Claims. (Cl. 204—164)

This invention relates to the generation of high-velocity streams of activated gases. It relates also to methods of producing chemicals by using such streams of activated gases.

The term "activated" has many connotations. It is used here in its physical-chemical sense and, in reference to gases, means broadly that the gases have been rendered capable of spontaneous and rapid chemical reaction. There are, of course, many ways in which gaseous chemical compounds may be activated or made more reactive than usual. One is by the addition of small quantities of certain catalytic materials which are capable of promoting particular reactions. Another is by exposing the gas to light of appropriate intensity and wavelength. The most commonly used method of activation is by heating to raise the temperature. It is well known that almost all chemical reaction rates increase exponentially with temperature.

Sometimes extremely high temperatures are required to bring about particular reactions and to make them occur at a reasonable rate. In such cases it may be possible to use high-current electric arcs, for example. Such arcs are capable of providing temperatures of the order of 12,000 degrees Kelvin and even higher. Shock-tube techniques are capable of developing temperatures of many thousands of degrees in gases. Such high temperatures are often accompanied by disadvantages. Thermal devices are non-selective in that all energetically possible activations occur simultaneously; moreover, the design and construction of equipment to contain gases at such high temperatures is extremely difficult.

It is well known that many of the active species occurring in gases at very high temperatures can be generated in gases by exposing them to low current or silent electric discharges. Such species include free atoms, free radicals, and even ions and electrons. Moreover, these species are not accompanied by the high temperatures which are required for their thermal generation as in high-current arcs or shock tubes. The presence of such active species at relatively low temperatures implies that the gas is not at equilibrium, although it may be in a steady-state condition as long as the discharge or other exciting means continues. While in the non-equilibrium steady state, characterized by a substantial content of various dissociated and active species at relatively low temperatures, gases are extremely reactive. It has long been known that a very great number of chemical reactions in gases can be brought about by activation with low-current, high-voltage electric discharges. Unfortunately, desired products are often dissociated and decomposed in the discharge as rapidly as they are formed; thus, conversions and yields are low. It sometimes happens that only one of the reactants in a prospective reaction needs to be activated by the discharge. In the customary methods of discharge synthesis where both reactants are mixed and exposed simultaneously to the discharge, there is frequently a power loss occasioned by the absorption of energy by a reactant which does not require activation. In fact, unnecessary activation of reactants can result in promotion of side reactions and a net loss of material. For these and other reasons, commercial production of chemicals by electric discharges has not been widely practiced.

A non-equilibrium steady-state gas, containing substantial proportions of dissociated species, occurs naturally in the earth's atmosphere at very high altitudes as a result of activation by sunlight. The properties of such a gas are of growing importance and interest for aerodynamic reasons as flight altitudes get higher and higher. It is desirable to have a source which will provide a high-velocity stream of activated and dissociated gas in order to study its aerodynamic behavior in the laboratory.

It is, therefore, a principal object of the present invention to provide a novel method of, and means for generation of, activated gases at relatively low temperatures and high velocities.

Another object of the invention is to provide improved means for rapidly removing gases activated by an electric discharge from the region of said discharge.

A further object of the invention is to provide a novel method of, and improved means for, electrically activating gases whereby the characteristic properties of said activated gases are preserved over a relatively long distance from the activating means.

Still another object of this invention is a novel method of, and means for, chemical synthesis in an electric discharge whereby reaction products in high yield are obtained.

Yet another object of this invention is to provide means for rapid mixing of a gas activated by an electric discharge with another reactant that has not been exposed to said electric discharge.

And another object of the present invention is to provide a novel method of, and means for, chemical synthesis by an electric discharge whereby the reaction product is not exposed to said electric discharge.

An electric current will flow between two electrodes separated by any gas if there exists a voltage difference between them. The magnitude of the current depends upon the magnitude of the voltage difference, the nature of the gas, its pressure and temperature, and the distance between the electrodes. The shape of the electrodes is also a factor; for example, the current flow between a sharp point and a flat plate is greater than the current flow between two flat plates, all other things being equal.

When relatively low voltages up to a few hundred volts are impressed on a pair of electrodes separated approximately one centimeter at atmospheric pressure, a small current flow of the order of microamperes is produced. Such current flow is known as Townsend or "dark" current, and is dependent upon the few ions which always exist in a gas due to cosmic rays or light. As the voltage between the two electrodes increases, the current also increases slowly. This is due to the faster ion movement brought about by the increasing electric field. At a certain potential difference, again depending upon the electrode distance, chemical nature of the gas, pressure and temperature, but usually of a magnitude in the thousands of volts there occurs a sharp increase in current flow to a value of the order of milliamperes. The increase in current is attributable to an increase in the number of ions and electrons in the gas. The increase in ion concentration is due to the formation of new ions by collision of electrons already present with neutral molecules. The marked current rise occurs when the electric field has become strong enough to provide the electrons with sufficient energy to ionize neutral molecules upon collision.

If the applied voltage is increased still further, the number of ions continually increases, causing a correspondingly increasing current flow. Finally a point is reached at which there occurs a sudden current increase to the order of many amperes. Simultaneously, the potential difference between the two electrodes drops to a few volts and there occurs what is known as a high-current arc. The phenomenon whereby there occurs a sudden increase in current flow and decrease in potential difference is often known as breakdown. The resulting arc discharge is characterized by extremely high gas temperatures, of the order of thousands of degrees. In such state, the thermal kinetic energy of the ions and molecules is sufficient to bring about further ionizing collisions; thus, very high ion concentrations obtain.

The electric discharge phenomena described can be brought about with either alternating or direct electric current. When alternating currents are employed, the electrodes do not need to be in direct contact with the gas, but may be covered with a dielectric material. In such cases, the current flow in the gas occurs by induction and the resulting discharge is frequently termed an electrodeless discharge. Electrodeless discharges are characterized by low currents, high voltages, and low gas temperatures.

The present invention relates only to the type of discharge occurring before breakdown, i.e., the type of discharge wherein the current densities are of the order of a few mililamperes per square centimeter, or less, and where the voltages involved are of a relatively high magnitude. Such discharges include those commonly known as corona, glow, electrodeless, and ozonizer discharges and are frequently referred to generically as "silent electric discharges." Thus, in the specification and claims following hereinafter, the term "discharge" shall mean a discharge of the silent type characterized by a relatively high voltage, a relatively low current density, and a relatively low gas temperature, as contrasted to the low voltage, high current, and high temperature of the arc discharge. The term "plasma" shall refer to gas which has been activated or excited by the discharge. Such gas is usually characterized by luminosity and usually contains substantial quantities of dissociated species such as free atoms, ions, and electrons. In its most common connotation, the term plasma refers to gas which has a relatively high degree of ionization. As a matter of convenience, the term plasma will be used here to indicate gas in any state of excitation or activation resulting from exposure to a discharge of the silent type, whether or not it is substantially ionized.

When the current flow in a discharge circuit is interrupted, the state of excitation in the gas between the electrodes, i.e., the plasma, decays with extreme rapidity. Observations of light emission as a function of time, and variation of electrical conductivity of the gas as a function of time, indicate that this decay or quenching time is often much less than a thousandth of a second. Thus, a plasma has a very fleeting and transient existence. This is one of the reasons that very little is known in detail about its nature.

I have discovered that the plasma from a silent electric discharge can be expanded at such a high velocity that its apparent characteristic properties will be preserved over quite long distances from the discharge space between the electrodes. While no material change is effected in the decay time of the plasma, yet this decay time is extended over a substantial distance by means of the very high gas velocity. Accordingly, it becomes possible to study the decay process by appropriate measurements at various points along the stream, each point corresponding in the steady state to a particular time. This same result cannot be achieved by simply passing a gas directly through a discharge at high velocity, as the discharge may not be stable and frequently is blown out at high gas velocities. It is, therefore, the essence of this invention that a discharge is maintained in a region of low gas velocity, and then a very high velocity is quickly imparted to the excited gaseous plasma by expanding it through a communicating passage or nozzle into a region where the pressure is lower than that of the discharge region itself.

Thus, in the present invention, means are provided for introducing a gas into a chamber at relatively low velocity where it is subjected to an alternating or direct current silent electric discharge. The gas is excited by the discharge into the plasma state. Means are provided for expansion of the plasma through a communicating passage into an expansion chamber, the pressure of which is substantially less than that of the discharge chamber, providing a jet of highly reactive gas moving at a high velocity. The communicating passage may be a channel in the form of a straight tube, or a nozzle comprising an inlet section, a throat, and an outlet section. Unless otherwise stated hereinafter, the term "nozzle" shall broadly mean any kind of communicating passage. In alternate embodiments, means are also provided for introduction of a second reactant gas at the nozzle exit for rapid mixing with the jet. Such an arrangement enables practice of chemical synthesis with an electric discharge whereby both the desired product and one of the reactants are protected from the discharge.

These and other objects, aspects, features, and advantages, of the invention will be apparent to those skilled in the art from the following more detailed description taken in conjunction with the appended drawings, wherein like or similar elements are afforded prime designations, and:

FIGURE 1 shows diagrammatically the basic apparatus of the invention;

FIGURE 2 illustrates one embodiment of the apparatus for carrying out processes in accordance with the invention; and FIGURE 3 illustrates an alternate embodiment of the apparatus wherein an electrodeless discharge is employed.

Reference is made to FIGURE 1, a schematic diagram of the basic arrangement of the apparatus for practicing the present invention. The gas to be activated is introduced through a reactant input duct 2 into a connecting discharge chamber 4. Positioned within the chamber 4 are a first discharge electrode 6 and a second discharge electrode 8 which in turn are electrically connected to the output terminals of an alternating or direct current high-voltage power supply, not shown. The electrodes may take many forms and the metal of the electrodes may be of various kinds. If platinum, or other refractory metal, is used the heat of radiation may provide adequate cooling. At relatively high-current densities, or when metals of lower melting point such as copper or aluminum are employed, it may be necessary to utilize other means of cooling, such as circulation of a fluid through channels in the electrodes. In such case where the coolant is electrically conductive, a sufficiently long path through non-conducting tubing must be provided for the coolant in order to minimize the leakage of electric current through the coolant to ground. Additionally, the leads connecting the electrodes to the power supply must be suitably insulated from the chamber walls when passing therethrough to forestall the possibility of a short circuit of the gap between the electrodes.

The reactant gas is exposed to a "silent" electric discharge maintained between the electrodes 6, 8, thereby becoming excited into a plasma state. The diameter of the discharge chamber 4 must be large enough so that the gas velocity between the electrodes 6, 8, is not so high as to blow out or quench the discharge. Velocities of a few feet per second have been found suitable but with some discharges, such as a high-frequency alternating-current discharge, or at very low pressures, velocities as high as one hundred feet per second or more may be used. Optimum chamber pressure depends upon a number of factors such as electrode distance and shape, power supply voltage, the nature of the gas, and the frequency of the current where an alternating current is employed. At low frequencies or with direct current, it is usually desirable to have the chamber pressure less than two atmospheres for electrode distances of a millimeter or more.

Immediately adjacent the discharge electrodes 6, 8, is provided a means of exit for the activated gas from the discharge chamber 4 into the expansion chamber 12. This exit means comprises a communicating channel between the discharge chamber 4 and the expansion chamber 12 formed in the shape of a nozzle 10. The gaseous plasma flows into the nozzle 10 and exhausts into the expansion chamber 12 at a high velocity. The pressure in the expansion chamber 12 is maintained at a value less than that in the discharge chamber 4. In this embodiment a vacuum pump, not shown, is connected to the expansion chamber 12 through an exhaust duct 14 containing a suitable throttling means, also not shown, for the regulation of pressure within the expansion chamber 12. Since the decay or quenching time of a plasma is much shorter at high pressures, the duration of plasma characteristics is greatly enhanced by expansion into a low-pressure environment. Because of this shortness of quenching time it is also important to have the entrance to the nozzle 10 as close to the discharge space between electrodes 6, 8, as possible.

The area of the throat of the nozzle 10 is principally determined by two factors. These are the velocity which is desired at the throat and the mass rate of flow of gas to be maintained. These factors can be varied over wide ranges, depending upon the length of time the gas is to be in the discharge region and the velocity desired in the jet of gaseous plasma. It has been found that good results are obtained when the ratio of the cross-sectional area of the discharge chamber to the cross-sectional area of the nozzle throat lies within a range from about 5 to 1 to about 100 to 1, or higher. In order to promote the flow of plasma from the discharge chamber 4 into the expansion chamber 12, the pressure in the latter must be lower than that in the former. The pressure in the latter can be controlled by suitable throttling means connected to a vacuum pump located in the exhaust duct 14 as previously described. For a given gas mass flow into the discharge chamber 4 the velocity in the nozzle throat will increase as the pressure in the expansion chamber 12 is decreased by opening the throttling means. There is a limit to this, however. When the ratio of pressure in the discharge chamber 4 to that in the expansion chamber 12 reaches a certain critical value the velocity in the throat of the nozzle 10 will reach a maximum value equal to the speed of sound in that gas. Further increases in the pressure ratio by decreasing the pressure in the expansion chamber will not increase the linear gas velocity at the throat. This critical pressure ratio depends upon the molecular weight and specific heat of the gas but is usually about two to one. It may be slightly less than this if there is a diffusing section on the nozzle exit so that some of the velocity head is recovered. Obviously, a desirable pressure ratio between the discharge and exhaust chambers can be obtained alternatively by increasing the pressure in the discharge chamber rather than decreasing the pressure in the exhaust chamber. Any convenient pumping, or exhausting, means will be suitable. The particular choice will depend upon the absolute pressure levels desired.

If the nozzle 10 is appropriately designed with a diverging or expanding section downstream of the throat, it is possible for the jet stream to reach velocities higher than the speed of sound. If high enough pressure ratios are employed, the jet velocities achieved with the use of suitable expanding sections may reach several times the local speed of sound in the gas. Thus, velocities on the order of thousands of feet per second may be obtained, depending upon the molecular weight of the gas, its temperature, and the pressure ratio existing between the chambers. Employment of a nozzle constructed so as to impart sonic, or supersonic, velocities to the reactive gas flowing therethrough would appear to afford certain advantages. Where such nozzles are used, downstream pressure fluctuations, i.e., pressure fluctuations within the expansion chamber, would have no effect on conditions obtaining upstream of the nozzle, within the discharge chamber. Use of such nozzles is not critical however, and the benefits of the present invention may also be realized where a nozzle is employed that will impart a high subsonic velocity to the gas flow therethrough.

Such high velocities offer the possibility of stretching out the plasma decay over a long distance for purposes of study and investigation. They also make possible very rapid mixing of the jet with a secondary stream, the benefits of which will be set forth presently.

Thus far the invention has been discussed generally in relation to its basic principles of operation. It will be apparent that its scope is not limited to any particular set of conditions but that advantages will be applicable to many circumstances. However, the practice of the invention is particularly adapted to certain chemical synthesis processes.

It is well known that electric discharges will promote reaction between various gaseous substances exposed to the discharge. Unfortunately, the products so formed are also frequently decomposed by the discharge almost as rapidly as they are formed. The net result is that when a mixture of gases to be reacted is passed through a discharge, the concentration of desirable product in the effluent from the discharge is usually quite low. Moreover, it often turns out that only one of the reactants really requires activation by the discharge, and the presence of another reactant in the discharge may result in losses of power due to absorption of energy by the second reactant. Often, the second reactant may be undesirably changed or even destroyed by the discharge. The influence of these factors is often manifested in low yields and conversions.

It has been found, as a result of the present invention, that greatly improved yields and conversions will often result if only one of the reacting gases is led through the discharge where it is activated, expanded into a high-velocity stream, and then rapidly admixed with a second reactant. In this manner, exposure of the product to the discharge is avoided and the discharge energy is confined to that reactant which it is specifically desired to activate.

A similar principle has been utilized before in scientific investigations by working at very low pressures, and taking great care to "poison" the surfaces to which the activated gas has been exposed. Under these conditions it is possible, for example, to withdraw hydrogen atoms or radicals slowly from a discharge, to conduct them through large bore tubing having walls coated with phosphoric acid, and then to mix the dissociated hydrogen with ethylene, for example, at some distance from the discharge. Great care must be taken with the coating of the surface of the surrounding duct in order to prevent the recombination of the atoms or radicals formed in the discharge before their relatively slow admixture by diffusion with a second reactant. However, this older technique does not adapt itself to production on a commercial scale because such small quantities of reactant can be treated and such low pressures are required. By practice of the present invention, large quantities of material may be processed in equipment of modest size because of the high flow velocities. Because there is rapid convective mixing of the free jet of activated gas with a secondary stream of reactant, it is not necessary to work at such low pressures nor to take such precautions as to the nature of the surface of the environmental chamber. An additional advantage is gained by the high-velocity stream because it makes possible a rapid quench of the reaction.

FIGURE 2 illustrates a preferred embodiment of the apparatus for carrying out such processes in accordance with the invention. A primary reactant input duct 2' provides a means of entrance into the discharge chamber 4', within which is located a first discharge electrode or anode 20. An anode connecting lead 24 connects the anode 20 with the positive terminal of a high-voltage power supply 28. Although an alternating-current source may be used the arrangement described in connection with this figure will be for a direct current power supply. Exit from the discharge chamber 4′ is provided through a nozzle 10′. A cathode connecting lead 26 ties the nozzle 10′ to the negative terminal of the high-voltage power supply 28, thereby making the nozzle 10′ the cathode or second discharge electrode. Alternatively, the nozzle 10′ could be connected to the positive terminal of the high-voltage power supply 28 and the first discharge electrode 20 to the negative terminal, thereby making the nozzle 10′ the anode, and the first discharge electrode 20 the cathode. The anode 20 comprises a metal thimble extending into the discharge chamber 4′. Where necessary, the discharge electrodes 10′, 20, may be cooled, for example, by constructing such electrodes with hollow interiors and circulating a fluid coolant therethrough. As mentioned with the arrangement of FIGURE 1, steps must also be taken to prevent electrical leakage to ground and short circuit of electrodes. The cathode-nozzle 10′ opens directly into the expansion chamber 12′, which is maintained at a pressure lower than that of the discharge chamber 4′ as desired by means of a suitable vacuum pump, not shown, connected to the expansion chamber 12′ through an exhaust duct 14′, within which may be located a throttling valve, also not shown. A secondary reactant input duct 30 provides a means of communication with the area in the immediate proximity of the expansion nozzle 10′.

In operation, a primary reactant gas is introduced into the discharge chamber 4′ by means of the primary reactant duct 2′ where it is exposed to a silent electrode discharge between the anode electrode 20 and the cathode electrode 10′. The location of the nozzle within the cathode permits direct withdrawal of the activated gas from the discharge with a minimum of delay, insuring that the gas is still highly activated at the time of entrance into the nozzle. Exit of the plasma, or activated gas, through the nozzle 10′ into the expansion chamber 12′ enables the activated gas stream to achieve high velocity. A second reactant gas is introduced into the expansion chamber 12′ by means of the secondary reactant input duct 30, where it is exposed to the activated jet. Because of the high velocity that may be obtained in the jet, mixing with the secondary stream occurs very rapidly and complete chemical reaction follows. After mixing, the mixture containing reaction products is permitted to flow downstream through the exhaust duct 14′ to a suitable means for separating the desired product. Means for separation are not shown but there are many possibilities, depending upon the nature of the product. Adsorption, condensation, solvent extraction, and many other techniques well known in the chemical engineering art may be used.

It is to be recognized that there are other means of admixing the two reactants other than the simple counter flow tube configuration of the secondary reactant input duct 30. For example, the second reactant can be introduced through a port, or series of ports, in the nozzle itself. Other possible configurations will be apparent to those skilled in the art.

Reference is made to FIGURE 3, which shows an embodiment employing an alternating-current electrodeless discharge. Here, the reactant gas is introduced through the primary reactant input duct 2″ which is connected to the annular shaped discharge chamber 4″. The discharge chamber 4″ is concentrically positioned between an inner vessel 42 and an outer vessel 44 which are constructed of a dielectric material such as glass. The inner vessel 42 and the outer vessel 44 are filled with a conducting liquid 50, a first conducting lead 46 being immersed in the fluid 50 within the outer vessel 44, and a second conducting lead 48 being similarly situated in the fluid 50 within the inner vessel 42. The leads 46, 48, are connected to the output terminals of an alternating-current, high-voltage power supply 38. The lower end of the discharge chamber 4″ communicates with an expansion nozzle 10″, the exit of which is located within an expansion chamber 12″. In the embodiment illustrated, means are provided for introducing a second reactant gas at the nozzle exit through a secondary reactant input duct 40′ connected to a collar ring 52 positioned at the nozzle exit 10″, said ring containing a plurality of orifices through which the secondary reactant emerges to rapidly admix with the primary reactant. The pressure in the expansion chamber 12″ is maintained lower than that of the discharge chamber 4″ by means of a vacuum pump, not shown, connected to the expansion chamber 12″ through the exhaust duct 14″. Throttling means for controlling the pressure and means for separating the reaction product, neither of which are shown, may also be connected to the exhaust duct 14″. Alternatively, the pressure ratio across the nozzle 10″ may be maintained by supplying the first reactant gas to the input duct 2″ at a superatmospheric pressure, the expansion chamber 12″ being maintained at atmospheric pressure. Variations of these arrangements may also be employed, so long as the pressure within the discharge chamber 4″ is maintained higher than that within the expansion chamber 12″.

The operation in this instance is identical to the embodiment of FIGURE 2, with the exception that the primary reactant gas is activated into a gaseous plasma by means of an electrodeless discharge maintained in the discharge chamber 4″. With an electrodeless discharge, which requires an alternating current, the electrodes are not required to be in direct contact with the gas and may be covered with a dielectric material. Application of an alternating current induces an electric current flow in the gas. The width of the annular discharge space, i.e., the distance from wall to wall of the discharge chamber 4″, may be varied, depending upon the voltage applied, nature of the gas employed, and the pressure within the chamber. For example, at atmospheric pressure with methane gas, a voltage of 12,000 volts at a frequency of 800 cycles per second will give a discharge current of the order of one-tenth milliampere per square centimeter of discharge surface if Pyrex glass is employed as the dielectric.

The principles of the invention are more particularly illustrated in the following examples:

By way of illustrating the invention I will describe a particular experiment. An apparatus similar to the one schematically shown in FIGURE 2 was assembled. The electrode 20 comprised a copper thimble 17 inches long and 1 inch in diameter inserted concentrically in one end of a piece of Pyrex glass pipe 1.5 inches in diameter and 20 inches long. It was secured by means of a flange fitting which provided a seal and through which was a passage 2′ to permit introduction of gas. The electrode 10′ comprised a brass plate with a conical converging-diverging passage cut in the center. The diameter of the passage at the throat was 0.186 inch. The brass plate was inserted by press fitting into a water-cooled flange which provided a seal between the short length of glass pipe comprising the discharge space 4 and a cross fitting of Pyrex pipe 4 inches in nominal diameter. Two arms of the cross were sealed by appropriate flanges. The third arm was connected to a 1.5 inch diameter line of Pyrex pipe about 6 feet long which led into a 1.5 inch diameter steel pipe connected with a large capacity mechanical vacuum pump. A gate valve in the steel pipe served as a throttling means. The power supply was a full-wave, highly-filtered, direct-current, power supply which could supply voltages up to 18,000 volts and currents up to 500 milliamperes. Gas was introduced through a rotameter to the inlet cut in the flange securing the electrode 20 which served as the anode. Electrode 10′ containing the nozzle served as the cathode. The distance between the two electrodes was about 12 inches.

The procedure for running an experiment was as follows. The cooling water was turned on to circulate through both flange-electrode assemblies. The vacuum pump was started and the pressure level brought down to about 2 millimeters of mercury (mm. Hg). The power supply was then turned on and the discharge commenced and filled the entire space between the electrodes. The valve controlling the inlet gas flow was then gradually opened until a flow of 2 liters per minute obtained at atmospheric pressure and ambient temperature. Immediately, the whole space downstream of the nozzle all the way to the steel vacuum line, a distance of about 6 feet, was filled with glowing gas. Air was the gas used. The discharge between the electrodes was a reddish violet in color and the glowing gas downstream of the nozzle was whitish. At this point, the pressure in the discharge chamber was about 15 mm. Hg and in the expansion chamber about 2 mm. Hg. Because of the luminosity of the whole downstream section and the low density of the gas at the low pressure, it was hard to distinguish a well-defined jet issuing from the orifice. The air feed rate was increased to about 24 liters per minute STP. The throttling valve in the vacuum line was then gradually closed until the pressure downstream of the nozzle was about 36 mm. Hg. Upstream in the discharge chamber it was about 230 mm. Hg. The voltage across the electrodes was 6,300 volts and the current was 220 milliamperes. The luminescent jet issuing from the nozzle was now clearly defined for a distance of about 8 inches. A series of Mach diamonds was visible indicating clearly that the jet was at supersonic velocity.

If the throttling valve was closed still further, the jet became shorter and more sharply defined until the pressure downstream reached a value of about 110 mm. Hg and upstream about 200 mm. Hg at which only about one-half inch of jet was apparent.

Similar experiments with similar results were carried out with nitrogen, oxygen, ammona, and hydrogen, as the gases. The main noticeable difference between the various gases was in the color of both the discharge and the jet and the size of the jet. With ammonia the discharge was white and the very bright white jet was shorter than with the other gases.

In another experiment with apparatus similar to that previously described, nitrogen was passed through the discharge at a rate of 130 liters per minute at STP. The pressure in the discharge chamber was 325 mm. Hg and in the downstream section the pressure was 45 mm. Hg. The voltage across the electrodes was 3,100 volts and the current was 380 milliamperes. A small stream of propane gas was introduced by a simple side tube into one arm of the cross fitting into which the nozzle discharged. The flow rate of the propane was about one liter per minute at STP. As soon as the propane flow was started the glow in the downstream section was quenched. When a sample of the exit stream was analyzed, substantial quantities of hydrogen cyanide were detected. In another experiment ethylene was substituted for propane giving a similar result.

In still another experiment, with a similar apparatus except that the throat diameter was 0.087 inch and the electrode distance was 4 inches, hydrogen was reacted with carbon tetrachloride. The hydrogen was passed through the discharge and the carbon tetrachloride was injected through 6 small holes (No. 60 drill) about 0.25 inch downstream from the throat in the expansion section of the nozzle. The presence of carbon tetrachloride caused the jet to glow with a strong yellow color, filling the exhaust chamber at high exhaust pressure (about 100 mm. Hg), but reducing the exhaust to a short well-defined jet of about 2 inches in length at lower exhaust pressures (about 10 mm. Hg). With 310 milliamperes and 1,600 volts, and sufficient hydrogen flow to give 300 mm. Hg pressure in the discharge chamber and 110 mm. Hg in the exhaust chamber, large quantities of hydrogen chloride were produced.

It will be obvious that there are many possible configurations of apparatus which will bring about the results described so long as the general conditions set forth are observed. The essential feature of the present invention is to expand the activated gas, which has been excited by exposure to the silent electric discharge, through a nozzle into a region of lower pressure in order to develop a high-velocity jet. This high-velocity jet can be rapidly admixed with a secondary stream of gas of any desired composition in order to form various chemical products which may be desired. Other uses of the invention will also occur to those skilled in the art.

What is claimed is:

1. Apparatus for the manufacture of chemicals comprising, means generating a silent electrical discharge, means introducing a first gas into said discharge at relatively low velocity and at a particular pressure, means removing said first gas from said discharge, means including a vacuum pump for causing said first gas to move in a relatively high velocity stream at a pressure lower than said particular pressure after exposure to said discharge, and means for rapidly admixing a second gas with said high velocity first gas.

2. An apparatus according to claim 1 including means for removing the reaction products of said first and second gases.

3. In an apparatus for the manufacture of chemicals, means for maintaining a silent electrical discharge in a flowing gas, means for introducing a first gas into said discharge at relatively low velocity and at a particular pressure, means including a vacuum pump for withdrawing said first gas from said discharge at relatively high velocity and for reducing the pressure thereon, and means for mixing a second gas with said first gas immediately after it is withdrawn from said discharge.

4. An apparatus for the manufacture of chemicals comprising, a first chamber containing first and second electrodes, means for maintaining a silent electrical discharge between said electrodes, means introducing a first gas flowing at relatively low velocity into said first chamber for exposure to said discharge, a second chamber, means providing relatively rapid flow of said first gas from said first chamber into said second chamber and for maintaining said second chamber at a pressure lower than that of said first chamber, exit means from said first chamber into said second chamber being located in close proximity to at least one of said electrodes, and means rapidly admixing a second gas with the rapidly flowing first gas within said second chamber.

5. Apparatus according to claim 4 in which said exit means includes a passageway which is located within one of said discharge electrodes.

6. A process for the manufacture of chemicals comprising, exposing a first gas moving at relatively low velocity to a silent electrical discharge, expanding said first gas after excitation by said discharge into a region of lower pressure to form a high velocity gas stream, and then rapidly admixing a stream of a second gas with said high velocity stream to form a reaction product.

7. In the manufacture of chemicals the process which comprises passing a first gas moving at relatively low velocity through a silent electrical discharge, subsequently expanding said first gas to form a high velocity jet, rapidly admixing the jet of activated gas with a second gas which is reactive with said first gas, and removing a desired product from the mixture of gases.

8. A process for the manufacture of chemicals comprising, passing a gas moving at relatively low velocity through a silent electrical discharge, subsequently expanding the gas into a region of lower pressure and providing it with a relatively high velocity, admixing with the high-velocity stream a secondary stream of reactant gas, and then separating a desired product from the mixture.

9. A process for the manufacture of chemicals comprising, generating a silent electrical discharge, exposing a reactant gas moving at relatively low velocity to said discharge for activation, removing the activated gas from said discharge, expanding said activated gas while causing it to move at sonic or higher velocities, rapidly mixing said high velocity gas stream with a secondary stream of reactant gas, and separating a desired reaction product from the mixed stream.

References Cited in the file of this patent

UNITED STATES PATENTS

| | | |
|---|---|---|
| 1,051,120 | Von Koch | Jan. 21, 1913 |
| 1,233,926 | Serpek | July 17, 1917 |
| 2,458,320 | Unchuld | Jan. 4, 1949 |
| 2,458,321 | Unchuld | Jan. 4, 1949 |
| 2,684,329 | Rouy | July 20, 1954 |
| 2,837,654 | Berghaus et al. | June 3, 1958 |
| 2,860,094 | Ishizuka | Nov. 11, 1958 |
| 2,916,534 | Schallus et al. | Dec. 8, 1959 |

FOREIGN PATENTS

| | | |
|---|---|---|
| 20,697 | Great Britain | Sept. 17, 1908 |